United States Patent
Haruta et al.

(10) Patent No.: US 10,493,734 B2
(45) Date of Patent: Dec. 3, 2019

(54) VOID-CONTAINING HEAT-SHRINKABLE POLYESTER FILM

(71) Applicant: TOYOBO CO., LTD., Osaka (JP)

(72) Inventors: Masayuki Haruta, Tsuruga (JP); Norimi Tabota, Osaka (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 16/089,840

(22) PCT Filed: Mar. 28, 2017

(86) PCT No.: PCT/JP2017/012552
§ 371 (c)(1),
(2) Date: Sep. 28, 2018

(87) PCT Pub. No.: WO2017/170495
PCT Pub. Date: Oct. 5, 2017

(65) Prior Publication Data
US 2019/0337272 A1    Nov. 7, 2019

(30) Foreign Application Priority Data

Mar. 31, 2016  (JP) ................................. 2016-071201

(51) Int. Cl.
| | | |
|---|---|---|
| B32B 27/08 | (2006.01) | |
| B32B 27/20 | (2006.01) | |
| B29C 48/00 | (2019.01) | |
| B29C 48/21 | (2019.01) | |
| B29C 48/88 | (2019.01) | |
| B65C 3/06 | (2006.01) | |
| B65D 23/08 | (2006.01) | |
| B32B 27/36 | (2006.01) | |
| B32B 7/02 | (2019.01) | |
| B29L 31/00 | (2006.01) | |
| B29K 67/00 | (2006.01) | |
| B29K 509/02 | (2006.01) | |
| B32B 5/18 | (2006.01) | |

(52) U.S. Cl.
CPC .......... *B32B 27/08* (2013.01); *B29C 48/0018* (2019.02); *B29C 48/022* (2019.02); *B29C 48/21* (2019.02); *B29C 48/88* (2019.02); *B29C 48/914* (2019.02); *B32B 5/18* (2013.01); *B32B 7/02* (2013.01); *B32B 27/20* (2013.01); *B32B 27/36* (2013.01); *B65C 3/065* (2013.01); *B65D 23/0878* (2013.01); *B29K 2067/00* (2013.01); *B29K 2509/02* (2013.01); *B29K 2995/0049* (2013.01); *B29L 2031/744* (2013.01); *B32B 2264/102* (2013.01); *B32B 2307/736* (2013.01); *B32B 2519/00* (2013.01); *Y10T 428/24992* (2015.01); *Y10T 428/249953* (2015.04); *Y10T 428/249987* (2015.04); *Y10T 428/249989* (2015.04)

(58) Field of Classification Search
CPC .......... B29C 44/00–605; B29C 48/022; B29C 48/914; B29C 48/21; B29C 48/07; B29C 48/88; B32B 27/08; B32B 27/20; B32B 27/36; B32B 7/02–14; B32B 5/18–32; Y10T 428/249953; Y10T 428/249975; Y10T 428/24998; Y10T 428/24987–24989; Y10T 428/24991–24992
See application file for complete search history.

(56) References Cited

U.S. PATENT DOCUMENTS

| | | | |
|---|---|---|---|
| 2002/0090502 A1 | 7/2002 | Ito et al. | |
| 2009/0233024 A1* | 9/2009 | Ballard | B29O 44/22 428/34.9 |
| 2011/0008607 A1* | 1/2011 | Haruta | B29O 55/14 428/304.4 |
| 2012/0100363 A1 | 4/2012 | Yamamoto et al. | |

FOREIGN PATENT DOCUMENTS

| | | |
|---|---|---|
| JP | 2002-036356 A | 2/2002 |
| JP | 2005-112906 A | 4/2005 |
| JP | 2010-047006 A | 3/2010 |
| WO | WO 2010/143737 A1 | 12/2010 |

OTHER PUBLICATIONS

Machine translation of JP2010-047006. Retrieved Aug. 27, 2019.*
Japanese Patent Office, International Search Report in International Patent Application No. PCT/JP2017/012552 (dated May 23, 2017).
Japanese Patent Office, Written Opinion of the International Searching Authority in International Patent Application No. PCT/JP2017/012552 (dated May 23, 2017).

* cited by examiner

*Primary Examiner* — Prashant J Khatri
(74) *Attorney, Agent, or Firm* — Leydig, Voit & Mayer, Ltd.

(57) ABSTRACT

The present invention provides a void-containing heat-shrinkable polyester film which has satisfactory shrinkage finishing properties and printability even if productivity is improved.
The void-containing heat-shrinkable polyester film is a multilayer structure having a non-foamed layer on both outer sides of the foamed layer, and by controlling the film thickness, density, and number of moles of the amorphous component on both outer sides, specific heat shrinkage characteristics and gloss can be improved.

16 Claims, No Drawings

VOID-CONTAINING HEAT-SHRINKABLE POLYESTER FILM

CROSS-REFERENCE TO RELATED APPLICATIONS

This patent application is the U.S. national phase of International Patent Application No. PCT/JP2017/012552, filed Mar. 28, 2017, which claims the benefit of Japanese Patent Application No. 2016-071201, filed on Mar. 31, 2016, which are incorporated by reference in their entireties herein.

TECHNICAL FIELD

The present invention relates to a void-containing heat-shrinkable polyester film, particularly to a heat-shrinkable polyester film suitable for labels. Further in detail, the present invention relates to a void-containing heat-shrinkable polyester film for labels of PET bottles, which can have a beautiful appearance without curling and the like when a label is shrunk on a PET bottle.

BACKGROUND ART

As a heat-shrinkable film, particularly a heat-shrinkable film for a label on a bottle body part, films including polyvinyl chloride, polystyrene, or the like are mainly used. However, with respect to polyvinyl chloride, in these years, chlorine gas generation at the time of incineration for disposal becomes a problem and with respect to polystyrene, there is a problem that printing is difficult, and heat-shrinkable polyester films almost free from these problems have drawn attention. However, the specific gravity of a polyester film is as heavy as about 1.4. Since general heat-shrinkable polyester films are transparent, the light transmittance is high, so that such films are not suitable for protection of contents. Thus, there is a great demand for a void-containing heat-shrinkable polyester film in which formation of voids reduces the specific gravity and decreases the light transmittance.

Therefore, a void-containing heat-shrinkable polyester film has been investigated. A method in which an incompatible thermoplastic resin is mixed in the main raw material of the heat-shrinkable polyester film is proposed (Patent Document 1).

PRIOR ART DOCUMENT

Patent Document

Patent Document 1: JP-A-2002-36356

SUMMARY OF THE INVENTION

Problems to be Solved by the Invention

According to the method in which a thermoplastic resin incompatible with polyester is mixed in the main raw material of the heat-shrinkable polyester film as disclosed in Patent Document 1, a void-containing heat-shrinkable polyester film can be produced by mixing a thermoplastic resin incompatible with polyester in the main raw material and the apparent specific gravity can be adjusted to lower than 1.00 by increasing the ratio of the thermoplastic resin incompatible with polyester. Patent Document 1 further discloses that there is no problem with printing when a layer which is not foamed is set at the outer side.

In recent years, production has generally been increased with an increase in speed for reducing cost and improving efficiency. However, in the case of uniaxial drawing in the width direction, which is a common method for producing a heat-shrinkable polyester film, in order to achieve acceleration, it is necessary to increase the speed in a process in which a molten resin discharged from a die in an extrusion process is solidified by a cooling roll.

However, as the solidification speed in the cooling roll is increased, a difference in cooling rate becomes large between a surface in contact with the cooling roll and a surface not in contact with the cooling roll. As a result, a problem arises in that a film which becomes a finished product curls.

In a layer structure in which three or more layers including a foamed layer (void-containing layer) and a non-foamed layer (non-void containing layer) are provided, a shrinkage behavior in heat shrinking is different between the foamed layer and the non-foamed layer. In the foamed layer, in general, foaming inhibits shrinkage, so that a shrinkage speed is slow, and in the non-foamed layer, the shrinkage speed is faster than that of the foamed layer. Thus, if shrinkage behaviors of the non-foamed layers as both outer sides in the film thickness direction are different, wrinkles and the like are likely to occur at the time of shrinkage finish, which is not preferable. Thus, in order to reduce a shrinkage speed difference between both outer sides, it is desirable that a difference between the non-foamed layers on both outer sides is small. For that purpose, it is desired that a thickness difference between the non-foamed layers on both outer sides is small, a difference in crystallinity such as density is small, and a deviation of a raw material composition is small.

Since the void-containing heat-shrinkable polyester film has a low light transmittance and excellent shielding property, contents can be protected by covering the entire container in a beverage PET bottle, for example. Thus, there is a demand for a film with a high shrinkage to cover the entire container. When the shrinkage is high, in order to perform shrinkage finish so as to obtain satisfactory appearance, the shrinkage speed difference between the non-foamed layers on both outer sides of the film becomes important as described above.

An object of the present invention is to solve the problems of the conventional void-containing heat-shrinkable polyester film and to provide a void-containing heat-shrinkable polyester film which can be produced at high speed and has satisfactory shrinkage finishing properties without curling due to heat shrinkage.

Solutions to the Problems

In order to solve the above-mentioned problems, the present inventors have made extensive studies and, as a result, have completed the present invention. That is, the present invention has the following constitution.

According to a first aspect of the present invention, a void-containing heat-shrinkable polyester film comprising a structure having three or more layers including at least one polyester resin layer containing voids and at least two layers sandwiching the void-containing layer, wherein the void-containing heat-shrinkable polyester film satisfies the following requirements (1) to (7):

(1) heat shrinkage in a main shrinkage direction is 30% or more and 85% or less when being treated in hot water at a treatment temperature of 90° C. for a treatment time of 10 seconds;

(2) gloss on both sides of the film measured at an angle of 60 degrees is 40% or more and 150% or less;

(3) a thickness difference between both outermost layers of the film is 2 μm or less;

(4) thicknesses of both outermost layers of the film are 3 μm or more and 12 μm or less;

(5) a density difference between both outermost layers of the film is 0.005 g/cm$^3$ or less;

(6) a difference in the number of moles of an amorphous component between both outermost layers of the film is 1 mol % or less; and (7) light transmittance is 40% or less.

According to a second aspect of the present invention, the void-containing heat-shrinkable polyester film according to the first aspect of the present invention, wherein a maximum value of heat shrinkage stress in hot air at 90° C. is 9 MPa or less.

According to a third aspect of the present invention, the void-containing heat-shrinkable polyester film according to the first aspect or the second aspect of the present invention, wherein the film has at least one layer containing titanium oxide.

According to a forth aspect of the present invention, the void-containing heat-shrinkable polyester film according to any one of the first aspect to the third aspect of the present invention, wherein a solvent adhesive strength is 2 N/15 mm width or more and 10 N/15 mm width or less.

According to a fifth aspect of the present invention, the heat-shrinkable label including the void-containing heat-shrinkable polyester film according to any one of the first aspect to the forth aspect of the present invention.

According to a sixth aspect of the present invention, a package comprising the heat-shrinkable label according to the fifth aspect of the present invention covering at least a portion of an outer periphery of an object to be packaged.

According to a seventh aspect of the present invention, a method for producing the void-containing heat-shrinkable polyester film according to any one of the first aspect to the forth aspect of the present invention, comprising positively cooling both outermost layers to reduce the density difference between both outermost layers in a step of forming an undrawn film from a molten resin.

According to an eighth aspect of the present invention, a method for producing the void-containing heat-shrinkable polyester film according to any one of the first aspect to the forth aspect of the present invention, comprising, as a step of positively cooling both outermost layers in a step of forming an undrawn film from a molten resin, cooling one layer with a cooling roll and applying cooling air to the layer on the opposite side to cool the layer by using an apparatus adjusted such that a wind speed difference in a longitudinal direction is 1 m/sec or less.

Effects of the Invention

The void-containing heat-shrinkable polyester film of the present invention has high shrinkability in the width direction, which is a main shrinkage direction, and satisfactory shrinkage finishing properties in labeling. In addition, when an undrawn film is formed, thickness difference, density difference, and amorphous raw material difference between layers on both outer sides of the film are small, and the shrinkage finishing properties after drawing can be improved.

Usually, when a laminate configuration is extruded to be solidified by a cooling roll at high speed, the density difference (difference in crystallinity) of outer layers of a non-foamed layer contributing to the shrinkage finishing properties is different, and the shrinkage behaviors are different, so that the shrinkage finishing properties are deteriorated. Particularly, in recent years, such a problem is liable to occur because the solidifying speed in the cooling roll increases due to an increase in production amount (production with increasing speed) for cost reduction and the like. According to the present invention, a density difference between non-foamed layers on both outer sides of an undrawn film can be reduced when a void-containing heat-shrinkable polyester film is produced at high speed. As a result, satisfactory shrinkage finishing properties are obtained, and it is possible to obtain a beautiful appearance when the void-containing heat-shrinkable polyester film is made into a label of a PET container.

Accordingly, according to the present invention, it is possible to provide a void-containing heat-shrinkable polyester film which can be produced at high speed, has satisfactory shrinkage finishing properties without curling due to heat shrinkage, and has satisfactory printability.

A white heat-shrinkable polyester film of the present invention is excellent in aesthetic appearance, has a light shielding property without being printed or processed, and has excellent aesthetic appearance even when being printed.

In addition, the void-containing heat-shrinkable polyester film of the present invention has a high adhesive force when the front and back surfaces (or two front or back surfaces) are bonded with a solvent. Accordingly, the film can be suitably used for various cover labels and the like including a label for a PET bottle and the like.

MODE FOR CARRYING OUT THE INVENTION

A void-containing heat-shrinkable polyester film according the present invention compress a structure having three or more layers including at least one polyester resin layer containing voids and at least two layers sandwiching the void-containing layer, wherein the void-containing heat-shrinkable polyester film satisfies the following requirements (1) to (7):

(1) heat shrinkage in a main shrinkage direction is 30% or more and 85% or less when being treated in hot water at a treatment temperature of 90° C. for a treatment time of 10 seconds;

(2) gloss on both sides of the film measured at an angle of 60 degrees is 40% or more and 150% or less;

(3) a thickness difference between both outermost layers of the film is 2 μm or less;

(4) thicknesses of both outermost layers of the film are 3 μm or more and 12 μm or less;

(5) a density difference between both outermost layers of the film is 0.005 g/cm$^3$ or less;

(6) a difference in the number of moles of an amorphous component between both outermost layers of the film is 1 mol % or less; and (7) light transmittance is 40% or less.

Hereinafter, embodiments of the present invention will be described in detail.

Regarding the heat-shrinkable polyester film of the present invention, its undrawn film can be obtained by melt-extruding polyester composed of a dicarboxylic acid component and a polyhydric glycol component by an extruder and forming a film by cooling the extruded product with a conductive cooling roll (a casting roll or the like).

At the time of the extrusion, in order to provide the film with a necessary heat shrinkage property, a copolyester is extruded alone, or a plurality of polyesters (copolyesters or homopolyesters) are extruded while being mixed. That is, the film contains a base unit (such as a crystalline unit of polyethylene terephthalate or the like) and a second alcohol component which is different from the polyhydric glycol component (ethylene glycol component or the like) constituting the base unit and which provides amorphousness to the film. A main acid component constituting the base unit is preferably terephthalic acid and a main diol component is preferably ethylene glycol.

In addition, the contents of the acid component and the diol component of the present invention are contents of the acid component and the diol component to the total of the polyesters in the case of two or more kinds of polyesters are used in combination. It does not matter whether interesterification is carried out or not after the mixing.

The above-mentioned polyesters can all be produced by polymerization through conventional methods. For example, the polyesters can be obtained by a direct esterification method of causing direct reaction of a dicarboxylic acid and a diol and an interesterification method of causing reaction of a dicarboxylic acid dimethyl ester and a diol. The polymerization may be carried out either in batch way or in continuous way.

When a polyester film containing the second alcohol component other than ethylene glycol is drawn, a heat-shrinkable polyester film can be obtained easily.

Those usable as the second alcohol component for providing amorphousness are a diol component and a trihydric or more alcohol component. Diol components include alkylene glycols such as ethylene glycol, 1,3-propanediol, 1,4-butanediol, 2,2-diethyl-1,3-propanediol, 1,6-hexanediol, 3-methyl-1,5-pentanediol, 2-methyl-1,5-pentanediol, 1,9-nonanediol, and 1,10-decanediol; cyclic alcohols such as 1,4-cyclohexanedimethanol; ether glycols such as diethylene glycol, triethyleneglycol, polypropyleneglycol, polyoxytetramethyleneglycol, and alkylene oxide adduct of bisphenol compound or its derivatives; and dimer diol. Trihydric or more alcohols include trimethylolpropane, glycerin, pentaerythritol and the like.

The polyester preferably has 14 mol % or more of the sum of at least one monomer capable of forming an amorphous component in 100 mol % of the polyhydric alcohol component in the whole polyester resin, more preferably 16 mol % or more, further preferably 18 mol % or more. Here, as a monomer capable of forming an amorphous component, there can be listed neopentylglycol, 1,4-cyclohexanediol, and the like.

Further, in order to produce a heat-shrinkable polyester film excellent especially in shrinkage finishing properties and to improve the shrinkage finishing properties even at high heat shrinkage, the amount of neopentylglycol or 1,4-cyclohexanedimethanol component is preferably 14 mol % or more, more preferably 16 mol % or more, and further preferably 18 mol % or more in 100 mol % of the polyhydric alcohol component in the entire polyester resin as described above. The upper limit of the component is not particularly limited; however, if the amount of the component is too large, the heat shrinkage may excessively become too high or the breakage resistance of the film may be worsened in some cases and therefore, it is preferably 40 mol % or less, more preferably 35 mol % or less, and further preferably 30 mol % or less.

In order to improve the shrinkage finishing properties, it is preferable to adjust the content of a polyester elastomer to 3% by mass or more. Herein, the polyester elastomer is, for example, a polyester block copolymer composed of a high melting point crystalline polyester segment (Tm 200° C. or more) and a low melting point soft polymer segment (Tm 80° C. or less) with a molecular weight of 400 or more, preferably 400 to 800, and examples thereof include polyester elastomers using a polylactone such as poly-ε-caprolactone as the low melting point soft polymer segment.

Further, the shrinkage in the direction orthogonal to the main shrinkage direction can be within a proper range by adjusting the polyester elastomer in the above-mentioned range and combining it with a preferable production method and conditions as described below.

It is preferable not to contain aliphatic linear diols having 8 or more carbon atoms (for example, octanediol etc.) or polyhydric alcohols of trihydric or more (for example, trimethylolpropane, trimethylolethane, glycerin, diglycerin etc.). In the heat-shrinkable polyester film obtained by using polyester containing these diols or polyhydric alcohols, it is difficult to secure the necessary shrinkage in the main shrinkage direction.

Further, it is preferable not to contain diethyleneglycol, triethyleneglycol, and polyethyleneglycol as far as possible. Particularly, diethyleneglycol tends to be present since it is a byproduct component at the time of polyester polymerization; however, the content of diethylene glycol is preferably less than 4 mol % in the polyester to be used in the present invention.

In the present invention, in order to provide a film with light shielding property by adjusting the whole light transmittance of the film within a specified low range, particles such as inorganic particles or organic particles are added to the film in an amount of preferably 0.1 to 20% by mass and more preferably 1 to 15% by mass on the film mass. In the case where the content of the particles is less than 0.1% by mass, it tends to be difficult to obtain, for example, sufficient light shielding property and it is therefore not preferable. On the other hand, if it exceeds 20% by mass, the film strength may be lowered, film formation tends to be difficult, and it is therefore not preferable.

The particles may be added before polyester polymerization but generally added after polyester polymerization. Examples of the inorganic particles to be added include known inactive particles of kaolin, clay, calcium carbonate, silicon oxide, calcium terephthalate, aluminum oxide, titanium oxide, calcium phosphate, carbon black, etc.; high melting point organic compounds insoluble at the time of melt-film formation of polyester resins; crosslinked polymers; and inner particles formed in the polymers at the time of producing polyester from metal compound catalysts, for example, alkali metal compounds and alkaline earth metal compounds to be used at the time of synthesis of polyester. Above all, titanium oxide particles are preferable from the viewpoint of efficiently providing necessary light shielding property.

The average particle diameter of the above-mentioned particles contained in the film is in a range of 0.001 to 3.5 μm. Herein, the average particle diameter of the particles is measured by a Coulter Counter method. The average particle diameter of the particles is preferably 0.001 μm or more and 3.5 μm or less, and more preferably 0.005 μm or more and 3.0 μm or less. If the average particle diameter of the particles is less than 0.001 μm, it becomes difficult to obtain, for example, the necessary light shielding property and therefore it is not preferable. If the average particle diameter of the particles exceeds 3.5 μm, the film surface becomes inferior in the smoothness and an inconvenient consequence such as missing of printing may be occurred and it is not therefore preferable. The average particle diameter of anatase type titanium oxide particles is generally 2.0 μm or less and the average particle diameter of rutile type titanium oxide particles is generally 2.0 μm or more. In order to shield visible light, the particle diameter of 2.0 to 3.0 μm is most efficient, and rutile type titanium oxide particles generally have higher shielding property than anatase type titanium oxide particles.

Titanium oxide particles can be classified into crystal forms; anatase form and rutile form. Both are used for kneading with plastics. The anatase form tends to cause yellowing or deterioration of resins by direct sunlight or the like, and in the case of outdoor use, the surface of titanium oxide is often subjected to special treatment (with alumina, silica, organics, etc.) or rutile form is often selected.

In the present invention, in order to adjust the apparent specific gravity of the entire film to lower than 1.00, it is preferable, for example, to form fine voids in the inside. For example, a foam material or the like may be mixed and extruded, and a preferable method is for obtaining voids by mixing an incompatible thermoplastic resin in polyester and drawing the resultant product in at least uniaxial direction. Specific examples of the resin incompatible with polyester include polystyrene resins, polyolefin resins, polyacrylic resins, polycarbonate resins, polysulfone resins, and cellulose resins.

The content of a resin incompatible with polyester is preferably in a range of 5 to 30% by weight or less in terms of film. If the content of the incompatible resin is less than 5% by weight, for example, the number of voids formed in the film is low and the effect to lower the apparent specific gravity tends to be insufficient, and therefore, it is not preferable. If the content of the incompatible resin exceeds 30% by weight, for example, the kneading in the extrusion process tends to become uneven and it becomes difficult to obtain a stable film, and therefore, it is not preferable.

The polystyrene resin refers to a thermoplastic resin containing a polystyrene structure as a base constituent, and examples thereof include in addition to homopolymers such as atactic polystyrene, syndiotactic polystyrene, and isotactic polystyrene, modified resins which are graft- or block-copolymerized with other components, for example, an impact-resistant polystyrene resin, a modified polyphenylene ether resin and the like, further, a mixture with a thermoplastic resin compatible with these polystyrene resins, for example, polyphenylene ether.

As a polyolefin resin, a cyclic polyolefin is preferable. As a cycloolefin unit of a cyclic polyolefin resin, it is preferable to have norbornene and tetracyclododecene units. Also, as a copolymerization unit, it is preferable to have an acyclic olefin monomer unit, and particularly preferably an ethylene unit. Particularly preferred cycloolefin copolymers are norbornene-ethylene copolymers and tetracyclododecane-ethylene copolymers. Among them, a cyclic polyolefin resin containing an ethylene unit in an amount of 5 to 80% by weight, preferably 10 to 60% by weight is particularly preferable.

A cyclic polyolefin resin generally has a glass transition temperature of −20 to 400° C., and the cyclic polyolefin resin to be used in the present invention must have a glass transition temperature of 100 to 230° C., and preferably 130 to 200° C. If the glass transition temperature is lower than 100° C., Tg may possibly be lower than the temperature at the time of drawing of an undrawn film, foaming becomes hard at the time of drawing the film, and therefore, it is not preferable. On the other hand, if Tg is higher than 230° C., uniform mixing with a polymer in an extruder becomes difficult, and the properties of films become uneven, for example, so that it becomes difficult to extrude a polymer mixture.

In preparing a polymer mixture obtained by mixing with the above-described incompatible resin with polyester, for example, chips of each resin may be mixed and melt-kneaded inside an extruder, then extruded, or those obtained by previously kneading both resins with a kneading machine may be further melt-extruded from an extruder. Further, an incompatible resin with polyester such as polystyrene resin is added in a polymerization process of polyester, and the chip obtained by stirring and dispersion may be melt-extruded.

It is preferable to provide a layer A containing substantially no void other than a layer B containing a large number of minute voids in the inside of the film in the present invention. In order to make this configuration, raw materials A and B are loaded separately to different extruders, molten, stuck to each other in a molten state before being subjected to a T-die or in the die, and cooled by a conductive cooling roll (a casting roll or the like) into the form of a film, whereby an undrawn film can be obtained.

Although the drawing is preferably uniaxial drawing, it may be biaxial drawing in which drawing is conducted at a lower ratio in a direction different from the direction of the uniaxial drawing (film width direction). In this case, it is preferable that the layer A contains no incompatible resin as a raw material. This makes it possible to be free from voids in the layer A, and the film can keep strength after printing. Further, since there is no void, the stiffness of the film is not lowered and the film becomes excellent in attachable property.

Furthermore, formation of voids has a function of lowering the shrinkage so that high heat shrinkage can be obtained by providing a void-free layer.

Further, in the film of the present invention, it is particularly preferable to provide the layer B containing a large number of voids as an intermediate layer and the layer A containing no void as both surface layers (both outermost layers). Since the polystyrene resin is added, smoke is emitted at the time of melt-extruding the resin mixture to stain the process and deteriorate the workability. The smoking problem is solved by using the layer B as an intermediate layer, and stable production is made possible for a long time. In this case, the expression that the layer A is the surface layer (outermost layer) also includes the case where the surface of the layer A is subjected to corona treatment, coating treatment, or the like which will be described later.

Hereinafter, a layer containing voids is also referred to as "foamed layer", and a layer containing no void is also referred to as a "non-foamed layer". The layer containing voids means a layer containing a resin incompatible with polyester and polyester and having voids formed by drawing, and the layer containing no void means a layer containing no resin incompatible with polyester.

Furthermore, based on necessity, additives such as a stabilizer, a coloring agent, an antioxidant, a defoaming agent, an antistatic agent, an ultraviolet absorbent, etc. may be contained. Additionally, in order to improve the whiteness of the film, a fluorescent brightener may be added.

The intrinsic viscosity of the heat-shrinkable polyester film of the present invention is preferably 0.60 dl/g or more. When the intrinsic viscosity of the heat-shrinkable film is too small, the molecular weight of the polyester constituting the film decreases. Therefore, durability of shrinkage stress upon heat shrinkage decreases, and defects such as shrinkage whitening and shrinkage unevenness tend to occur, so that the film is inferior in shrinkage finishing properties and appearance. In addition, when the molecular weight of the polyester decreases, the mechanical strength and breakage resistance of the film are deteriorated.

The intrinsic viscosity is preferably 0.60 dl/g or more, more preferably 0.63 dl/g or more.

Example of a method of increasing the intrinsic viscosity of the film include (1) a method of using polyester having a high molecular weight as a raw material of the film (for example, a method of using polyester having a intrinsic viscosity of 0.63 dl/g or more, preferably 0.68 dl/g or more, more preferably 0.70 dl/g or more), (2) a method of suppressing thermal decomposition or hydrolysis upon forming a film by extruding polyester (for example, a method of preliminarily drying a polyester raw material such that the moisture percentage is 100 ppm or less, preferably approximately 50 ppm or less and then extruding), (3) a method of using a hydrolysis-resistant polyester as the above-described polyester (for example, a method of using polyester having an acid value of 25 eq/ton or less), and (4) a method of adding an antioxidant (for example, in an amount of approximately 0.01 to 1% by mass) to polyester.

As a polymerization catalyst for polyester, various kinds of commonly used catalysts can be used, and examples thereof include titanium-based catalysts, antimony-based catalysts, germanium-based catalysts, tin-based catalysts, cobalt-based catalysts, and manganese-based catalysts; preferably titanium-based catalysts (titanium tetrabutoxide, etc.), antimony-based catalysts (antimony trioxide, etc.), germanium-based catalysts (germanium dioxide, etc.), and cobalt-based catalysts (cobalt acetate, etc.).

The void-containing heat-shrinkable polyester film of the present invention can be subjected to corona treatment, coating treatment, flame treatment, or the like for improving bondability to a film surface.

The void-containing heat-shrinkable polyester film of the present invention is treated in a hot water of 90° C. for 10 seconds under an un-loaded state, the thermal shrinking rate of the film in the width direction calculated by the formula: heat shrinkage=((length before shrinkage−length after shrinkage)/length before shrinkage)×100(%) from the lengths before and after shrinkage is preferably 30% or more and 85% or less. The lower limit value is more preferably 35% or more, further preferably 40% or more. The upper limit value is more preferably 82% or less, further preferably 80% or less.

In the case where the hot water heat shrinkage in the width direction at 90° C. is lower than 30%, insufficient shrinkage of a label occurs and therefore, it is unsuitable as a shrinkable film. On the other hand, in the case where it exceeds 85%, since the shrinkage is large, an inconvenient consequence, for example, jumping up of a label at the time of shrinkage treatment occurs and therefore, it is not preferable. In addition, the reason for employing a temperature of 90° C. is because its evaluation is often carried out at a temperature relatively close to boiling point of water, 100° C., in the case where the maximum heat shrinkage potential of a film is determined, assuming attachment treatment of a label is to be carried out in a steam tunnel or the like.

In the void-containing heat-shrinkable polyester film of the present invention, gloss measured at an angle of 60 degrees is preferably 40% or more and 150% or less. When the gloss is less than 40%, ink dropout occurs at the time of printing, and the film cannot have a beautiful appearance. The lower limit value is more preferably 43% or more, further preferably 46% or more. The higher the upper limit value, the better the printability becomes, which is preferable. However, in the void-containing heat-shrinkable polyester film, 150% is the limit.

The thickness of the void-containing heat-shrinkable polyester film of the present invention is not particularly limited; however, it is preferably 30 μm or more and 60 μm or less, assuming use of the film as a heat-shrinkable film for a label. In addition, the thickness of the constitution of the respective layers of the void-containing heat-shrinkable polyester film of the present invention is not particularly limited; however it is preferably 3 μm or more in each constitution.

In order to satisfy the above-mentioned properties, the film of the present invention has a layer structure of A/B/A, A/C/B/C/A, or the like when the layer A is a non-foamed layer and the layer B is a foamed layer. By adopting such a layer structure, it is possible to suppress curling during heat shrinkage as compared with other layer structures. The thickness ratio B/A of the layer A and the layer B is preferably 2/1 or more and more preferably 3/2 or more. If the thickness ratio of the layer B is small and B/A is lower than 1/1, it is difficult to satisfy both of low apparent specific gravity and satisfactory appearance.

It is desirable that a difference in thickness between both outermost layers of a film which are the non-foamed layers of the void-containing heat-shrinkable polyester film of the present invention is 2 μm or less. Since the non-foamed layer has a large influence on shrinkage, when the difference in thickness between two non-foamed layers is large, troubles such as curling and poor finish tend to occur during heat shrinkage. The upper limit value of the thickness difference between both outermost layers of the film which are the non-foamed layers is more preferably 1.5 μm or less, further preferably 1 μm or less. It is more preferable as the lower limit value is lower, because there is no curling or poor finish, and an ideal thickness difference is 0 μm.

It is desirable that each thickness of both outermost layers of the film which are the non-foamed layers of the void-containing heat-shrinkable polyester film of the present invention is 3 μm or more and 12 μm or less. The thickness of the non-foamed layer is related to an uneven state of the film surface and is related to printability. If the thickness is too large, the specific gravity of the film becomes high, which is not preferable as a void-containing film. The lower limit value of the thickness of an outer layer of the film as the non-foamed layer is more preferably 3.5 μm or more, further preferably 4 μm or more. The upper limit value is more preferably 11.5 μm or more, further preferably 11 μm or more.

It is desirable that a difference in density between both outermost layers of the film which are the non-foamed layers of the void-containing heat-shrinkable polyester film of the present invention is 0.005 g/cm$^3$ or less. Since the non-foamed layer has a large influence on shrinkage, when the difference in density (crystallinity) between the non-foamed layers is large, troubles such as curling and poor finish tend to occur during heat shrinkage. The upper limit value of the density difference between both outer layers of the film as the non-foamed layers is more preferably 0.004 g/cm$^3$ or less, further preferably 0.003 g/cm$^3$ or less. It is more preferable as the lower limit value is lower, because there is no curling or poor finish, and an ideal density difference is 0 g/cm³.

It is desirable that a difference in the content of an amorphous component between both outermost layers of the film which are the non-foamed layers of the void-containing heat-shrinkable polyester film of the present invention is 1 mol % or less. Since the non-foamed layer has a large influence on shrinkage, when the difference in the content of the amorphous component contributing to shrinkage of the non-foamed layer is large, troubles such as curling and poor finish tend to occur during heat shrinkage. The upper limit value of the difference in the content of the amorphous component between both outermost layers of the film which are the non-foamed layers is more preferably 0.8 mol % or less, further preferably 0.6 mol % or less. It is more preferable as the lower limit value is lower, because there is no curling or poor finish, and an ideal difference in the number of moles of the amorphous component is 0 mol %.

In the present invention, the whole light transmittance of the film is 40% or less, preferably 35% or less, more preferably 30% or less, further preferably 20% or less. When the whole light transmittance exceeds 40%, the contents are seen through or the printed matter is hard to see and the appearance may become inferior in some cases and therefore, it is not so preferable. In the present invention, the brightness is 70 or more, preferably 75 or more, more preferably 80 or more. When the brightness is less than 70, the contents are seen through or the printed matter is hard to see and the appearance may become inferior in some cases and therefore, it is not so preferable.

In the present invention, it is desirable that the maximum value of heat shrinkage stress of the film in hot air at 90° C. is 9 MPa or less. When the maximum value of the heat shrinkage stress is higher than 9 MPa, the shrinking speed becomes high, and the shrinkage finishing properties tends to be deteriorated. The upper limit value is more preferably 8 MPa or less, further preferably 7 MPa or less. Although it is more preferable as the lower limit value is lower, if the lower limit value is too low, a slack in a label after heat shrinkage increases, and therefore, the lower limit value is more preferably 1 MPa or more, further preferably 1.5 MPa or more.

The void-containing heat-shrinkable polyester film of the present invention preferably has solvent adhesive strength of 2 N/15 mm width or more to 10 N/15 mm. When the solvent adhesive strength is less than 2 N/15 mm width, it is not preferable because it tends to peel from a solvent-bonded portion after heat shrinkage of the label. The lower limit value is more preferably 3 N/15 mm or more, further preferably 4 N/15 mm or more. Additionally, the higher the solvent adhesive strength, the better, but it is considered that the upper limit of the solvent adhesive strength is about 10 (N/15 mm) from performance of a film forming equipment. When the solvent adhesive strength is too high, in bonding two films with a solvent to form a label, a situation that the film is bonded to an unnecessary film tends to occur, and the productivity of the label is sometimes lowered. Thus, the solvent adhesive strength may be 7 (N/15 mm) or less in view of practical use.

Next, a specific example of a process for producing the void-containing heat-shrinkable polyester film of the present invention will be described; however the present invention should not be limited to the production process.

The void-containing heat-shrinkable polyester film of the present invention is preferable to have an apparent specific gravity of 1.20 or less. The fact that the apparent specific gravity of the film is low and the film is lightweight is a considerable advantage in mass production. In the case where the apparent specific gravity of the film is less than 1.00, it becomes easy to separate a bottle and a label by gravity separation in water at the time of using the film as a label of a PET bottle, and thus it is more preferable. The apparent specific gravity of the film is more preferably 0.95 or less. However, if the apparent specific gravity of the film is too low, the film strength is easily lost, and therefore, the apparent specific gravity is preferably 0.75 or more. The apparent specific gravity of the film is more preferably 0.80 or more.

Polyester raw materials to be used in the present invention are dried by a drier such as a hopper drier or a paddle drier, or a vacuum drier, molten at a temperature of 200 to 300° C., and extruded into a film-like shape. At the time of the extrusion, any existing method such as a T die method or a tubular method may be used. After the extrusion, quenching is carried out to obtain an undrawn film.

With respect to the extrusion temperature, it is preferable to be carried out in a range of 250° C. to 290° C. If the extrusion temperature is lower than 250° C., for example, the load is too high and normal extrusion becomes difficult. If the extrusion temperature exceeds 290° C., it results in occurrence of inconvenient consequences such that the polyester resin tends to be thermally deteriorated in an extruder, and the mechanical strength of the film to be obtained is lowered.

It is important that the extrusion temperature of the non-foamed layer A is set to ±10° C. or less from the extrusion temperature of the foamed layer B. If the extrusion resin temperatures of the layer A and the layer B are extremely different, a melt viscosity difference becomes large, so that the layer ratio in the width direction of the layer A and the layer B of the undrawn film is different.

In addition, at least two extruders are necessary to extrude the layer A and the layer B. The layer A of the non-foamed layer may be discharged from one extruder, and the foamed layer B may be sandwiched by a feed block short of a die. At that time, the diameter, angle, and volume inside a pipe of the feed block divided after the layer A enters the feed block are made the same, whereby it is possible to reduce a difference in the ratio of amorphous raw materials with small thickness difference.

Alternatively, by using two extruders, the layer A may be formed as outer layers of the film sandwiching the layer B. However, in this case, it is necessary to design so that the ratio of raw materials entering the extruder becomes uniform. When different raw materials are mixed, it is necessary to install a stirrer in a hopper immediately before the entrance of the extruder and mix the raw materials. In addition, piping between the hopper and the extruder needs to be straight piping so that there is no deviation of a raw material composition when the stirred raw materials enter the extruder. It is important to adjust the temperature of a molten resin in the extruder such that a difference in resin pressure between the two layers A is ±3% or less before the feed block joining with the layer B. If the resin pressure of only one layer is high, such problems occur that the thickness of the layer with high resin pressure becomes high, the central portion on one side becomes high with the layer thickness ratio in the width direction of the undrawn film, and the layer thickness ratio of an end becomes high on the other layer. If the discharge in the two extruders for the layer A is the same and the pipe diameter and volume of the feed block are the same, the difference in resin pressure can be adjusted to ±3% or less by adjusting a difference in resin temperature in the two extruders to ±1° C. or less.

Then, it is usual to solidify the molten resin from the extruder with a cooling roll and produce an undrawn film. However, the inventors of the present invention have found that in this process, a difference in crystallinity (density) of each surface of the undrawn film is produced on a cooling roll surface side and a non-cooling roll surface side, which causes curling during heat shrinkage. More specifically, the cooling rate of the surface not in contact with the cooling roll is slowed, the crystallinity of a non-contact surface increases, and a difference in crystallinity is produced between a surface in contact with the cooling roll and the non-contact face. This phenomenon becomes more prominent when the cooling roll is rotated at a high speed in order to increase the productivity.

Thus, the inventors have applied cold air to the non-contact surface after contact with the cooling roll to reduce the crystallinity of the non-contact surface and have successfully suppressed the occurrence of curling during heat shrinkage.

It is preferable to use an apparatus capable of supplying cold air having a wide width so that cold air strikes in the entire film width direction. Since an end portion of the undrawn film is necked in when the molten resin is discharged from the die and is thicker than the central portion, it is preferable to adjust the end portion such that the cooling wind speed becomes high. The wind speed is adjusted using, for example, a punching plate, and it is more preferable to adjust the wind speed such that while the wind speed at the end portion is high, a wind speed difference in the width direction at the central portion is 5% or less.

In addition, it is preferable to perform cooling in the longitudinal direction while controlling cold air with a wind speed difference such that the wind speed difference is 1 m/sec or less. If the wind speed in the longitudinal direction varies more than 1 m/sec, a thickness difference occurs due to the strength of the wind speed in the undrawn film. Due to the thickness difference, it causes thickness unevenness in the longitudinal direction, and a difference occurs in the crystallinity of each surface.

The temperature of cold air is preferably set to a temperature lower by 3 to 15° C. than the temperature of the cooling roll. Since a heat transfer coefficient of cold air is lower than that of the cooling roll, it is preferable to make the temperature of the cold air lower than the temperature of the cooling roll. If the temperature of cold air is lower by 16° C. or more than the temperature of the cooling roll, dew condensation occurs on the cooling roll, which is not preferable.

The wind speed of cold air is preferably 4 m/sec or more and 25 m/sec or less although it depends on the cooling solidification speed. If the wind speed is lower than 4 m/sec, the cooling effect decreases, which is not preferable. On the other hand, if the wind speed is higher than 25 m/sec, although the cooling effect increases, the landing site of the molten resin on the cooling roll is different, and this causes thickness unevenness and a difference in crystallinity of each surface, which is not preferable.

Then, the undrawn film is drawn in at least one direction. Uniaxial drawing in the width direction of the film is preferable as described above. In drawing the undrawn film, preheating is first performed. The temperature of preliminary heating is within the range of Tg+10° C. to Tg+30° C. of the undrawn film. Drawing is then performed. The draw ratio is set to 3.4 times or more and 7.0 times or less, preferably 3.6 times or more and 6.5 times or less, with respect to the undrawn film. The drawing temperature is set to a predetermined temperature within the range of Tg−5° C. to Tg+15° C.

The lower the preheating temperature and drawing temperature, the higher the stress at the time of drawing, and it is possible to form larger voids and reduce apparent density. The same also applies to the draw ratio, the higher the draw ratio, the higher the stress at the time of drawing, and it is possible to form larger voids and reduce apparent density. However, when the stress at the time of drawing is too high, breakage occurs to deteriorate the productivity. Accordingly, the above range is optimal in order to achieve both the conditions for reducing the apparent density and the productivity.

Next, it is preferable to heat-set the film. The heat-setting temperature is within the range of Tg+5° C. to Tg+50° C. The heat-setting may be performed in a tense state in the drawing direction of the film. The tension rate at that time is preferably 6% or less.

When the heat-setting temperature is higher than Tg+50° C., the shrinkage in the film width direction decreases, and the voids are crushed, so that the apparent density increases, to make matters worse.

From the viewpoint of controlling the heat shrinkage stress of the film and the like, it is more preferable as the number of stages of drawing is larger. However, when the number of stages is too large, since it is difficult to design drawing equipment in industrial production, the number of stages is 6 or less, preferably 4 or less.

A package of the present invention is formed in such a manner that the above-mentioned void-containing heat-shrinkable polyester film is used as a base material and a label containing perforations is covered and heat-shrunk onto at least a portion of the outer periphery. As an object of the package, to start with PET bottles for beverages; various kinds of bottles and cans; plastic containers for confectionery, lunch box, etc.; paper box and the like can be listed (hereinafter these are collectively referred to as packaging objects). It is common that, when the packaging object is coated by means of thermal shrinking of the label where the void-containing heat-shrinkable polyester film is used as a base material, the label is subjected to thermal shrinking to an extent of about 2 to 15% and closely adhered to the packaging object. Incidentally, the label for covering the packaging object may be either printed or unprinted.

With regard to a method for preparing a label, there are a method where an organic solvent is applied to the area which is a bit inside from the end of one side of a rectangular film, the film is then immediately made round and the ends thereof are layered and adhered to make into a label and a method where an organic solvent is applied to the area which is a bit inside from the end of one side of a wound film in a roll shape, the film is then immediately made round and the ends thereof are layered and adhered and the resulting tube-shaped one is cut into a label. As to the organic solvent for the adhesion, it is preferred to use a cyclic ether such as 1,3-dioxorane or tetrahydrofuran. Besides the above, it is also possible to use an aromatic hydrocarbon such as benzene, toluene, xylene or trimethylbenzene; a halogenated hydrocarbon such as methylene chloride or chloroform; a phenol compound such as phenol; and a mixture thereof.

EXAMPLES

Next, the present invention will be described more concretely by way of Examples and Comparative Examples. However, the present invention is by no means limited by modes of the Examples, and may appropriately be modified within a range not deviated from the gist of the present invention.

Evaluation methods used in the present invention are as follows.

[Heat Shrinkage in Main Shrinkage Direction]

A film was cut into a square of 10 cm×10 cm and heat-shrunk in no load state for 10 seconds in hot water at a hot water temperature of 90° C.±0.5° C., and then the dimension of the film in the transverse direction (main shrinkage direction) was measured, and heat shrinkage was calculated according to the following Equation (1).

$$\text{Heat shrinkage} = ((\text{length before shrinkage} - \text{length after shrinkage})/\text{length before shrinkage}) \times 100 \text{ (\%)} \quad \text{Equation (1)}$$

[Whole Light Transmittance]

The whole light transmittance was determined by using NDH-1001DP manufactured by Nippon Denshoku Industries Co., Ltd.

[Gloss]

Measurement was carried out at an angle of 60° by using a gloss meter "VG 2000" (manufactured by Nippon Denshoku Industries Co., Ltd.) in accordance with JIS K 8741.

[Thickness and Thickness Difference of Film Outer Layer]

After the cross section of the film was cut, the thickness of each layer was measured using a scanning electron microscope "JSM-6510A" (manufactured by JEOL Ltd.). Then, the thickness difference of each layer was determined.

[Density Difference]

Only the film outer layer was scraped with a razor blade and sampled.

Using a density gradient tube containing a liquid (aqueous calcium nitrate solution) having a continuous density gradient in the tube, the sampled film as a specimen was put into the liquid for 24 hours, then the density of the specimen was read from the equilibrium position that is static in the liquid. The density of each of the outer layers was determined, and the difference was taken as the density difference.

[Difference in Amorphous Component Content]

Only the film outer layer was scraped with a razor blade and sampled. About 5 mg of a sampled film was dissolved in 0.7 mL of a mixed solution of deuterochloroform and trifluoroacetic acid (volume ratio 9/1), and the difference in amorphous component content was obtained by using 1H-NMR (UNITY 50, manufactured by VARIAN). The content (number of moles) of the amorphous component of each of the outer layers was determined, and the difference was taken as the difference in the content (number of moles) of the amorphous component. In the examples of the present application, the neopentyl glycol content was determined as the amorphous component content.

[Heat Shrinkage Stress]

Using a strength and elongation measurement apparatus, Tensilon (equipped with a heating furnace) manufactured by Orientec Co., Ltd., a sample with a length of 160 mm in the main shrinkage direction and a width of 20 mm was cut out of a heat-shrinkable film, and the positions of the film to be chucked were sandwiched by corrugated cardboard pieces with a size of 30 mm×28 mm, and the sample was attached to a chuck at a chuck interval of 100 mm in the atmosphere previously heated to 90° C. while air blowing was stopped and thereafter, the door of the heating furnace was quickly closed and the stress detected when air blowing (blowing velocity of 5 m/sec) was started was measured for 30 seconds, and the maximum value measured from a chart was defined as heat shrinkage stress (MPa).

[Apparent Specific Gravity of Film]

One sheet with a size of A4 (21.0 cm×29.7 cm) was cut out of a film to obtain a specimen. The thickness of the specimen was measured at 10 different points using a micrometer in 4 effective digits, and the average value of the thicknesses (t: μm) was calculated. The mass (w: g) of the one sheet specimen was measured by using an automatic scale balance in 4 effective digits, and apparent specific gravity was calculated according to the following Equation (2). The apparent specific gravity was rounded to two decimal places.

$$\text{Apparent specific gravity} = w/(21.0 \times 29.7 \times t \times 10^{-4}) = w \times 100/t \quad \text{Equation (2)}$$

[Solvent Adhesive Strength]

1,3-Dioxolan was applied in an amount of 5±0.3 g/m² and an application width of 5±1 mm on a heat-shrinkable film, and two pieces were bonded to seal. Thereafter, the seal portion was cut out into a width of 15 mm in the direction orthogonal to the seal direction, which was set at 20 mm chuck interval to a universal tensile tester STM-50 manufactured by Baldwin Corporation, and tensile peeling was carried out in a condition of a tensile speed of 200 mm/minute to measure peeling resistance. The strength at that time was defined as solvent adhesive strength.

[Shrinkage Finishing Properties]

On a heat-shrinkable film, a two color-printing with green and gold ink of Toyo Ink Manufacturing Co., Ltd. was provided previously. By bonding both end portions of the printed film with dioxolan, a cylindrical-form label (label in which main shrinkage direction of the heat-shrinkable film was the circumferential direction) was produced. Thereafter, using a steam tunnel manufactured by Fuji Astec, Inc. (model: SH-1500-L), the test was carried out by using a PET bottle of 500 ml (trunk diameter 70 mm, minimum diameter of neck portion 25 mm) at a zone temperature of 90° C. with a passing time of 10 seconds (the number of measurement=20).

In the attachment, such an adjustment was made that, on the neck portion, an area of 30 mm diameter contacted one of the ends of the label.

The evaluation was carried out visually, and the criteria were as follows.

good: no wrinkle, jumping up, and lack of shrinkage occurs.
poor: wrinkle, jumping up, or lack of shrinkage occur.

[Strain by Shrinkage in Label]

As an evaluation of the finish after shrinking, the strain in a 360° direction of the upper area of the attached label was measured using a gauge, and the maximum value of the strain was determined. At that time, the standards were as follows.

good: maximum strain was less than 1.5 mm.
poor: maximum strain was 1.5 mm or more.

[Curling]

As evaluation of curling after shrinkage, curling was measured using a gauge in a 360° direction of the upper area (neck portion) of the attached label. At that time, the standards were as follows.

good: maximum curl was less than 0.5 mm and no curl.
poor: maximum curl was 0.5 mm or more.

[Close Adhesion Property of the Label]

A label was attached under the same condition as the measuring condition for the above shrinkage finishing properties. When the attached label and the PET bottle were gently screwed, the case where the label did not move was marked "good" while the case where the label slipped through the bottle or the label and the bottle were shifted was marked "poor".

The polyesters used in Examples were as follows.

Polyester a: Polyethylene terephthalate (intrinsic viscosity: 0.75 dl/g)

Polyester b: Polyester (intrinsic viscosity: 0.78 dl/g) composed of 30 mol % of neopentyl glycol, 10 mol % of diethylene glycol, 60 mol % of ethylene glycol and terephthalic acid Polyester c: Polyester raw material (Product name: ET550 manufactured by Nippon Pigment Co., Ltd.) containing 50% by weight of polyester a and 50% by weight of titanium oxide Polyester d: Polybutylene terephthalate (intrinsic viscosity: 1.3 dl/g)

Raw material e: Cyclic polyolefin resin (Product name: Topas (registered trade name) 6017, manufactured by Polyplastics Co., Ltd.)

Raw material f: Amorphous polystyrene resin (Product name: G797N, manufactured by Japan Polystyrene Inc.)

TABLE 1

| | Dicarboxylic Acid Component (mol %) | Polyhydric Alcohol Component (mol %) | | | | Titanium Oxide (mass %) |
|---|---|---|---|---|---|---|
| | DMT | EG | NPG | DEG | BD | |
| Polyester a | 100 | 100 | — | — | — | — |
| Polyester b | 100 | 60 | 30 | 10 | — | — |
| Polyester c | Polyester a: 50% by mass | | | | | 50 |
| Polyester d | 100 | — | — | — | 100 | — |

| | Product Name |
|---|---|
| Raw Material e | TOPAS (Registered trademark) 6017 |
| Raw Material f | G797N |

Here, abbreviations in the table are as follows.
DMT: dimethyl terephthalate
EG: ethylene glycol
NPG: neopentyl glycol
DEG: diethylene glycol
BD: 1,4-butanediol

TABLE 2

| | Resin Composition | | | Amorphous Component mol % | Cooling Step | |
|---|---|---|---|---|---|---|
| | Layer A | Layer B | Layer C | | Cold Air to Non-Contact Surface | Cooling Roll Speed (m/min) |
| Example 1 | a/b/d = 5/75/20 | b/c/e = 65/15/20 | a/b/d = 5/75/20 | 21 | applied | 80 |
| Example 2 | a/b/d = 5/75/20 | b/c/f = 65/15/20 | a/b/d = 5/75/20 | 21 | applied | 80 |
| Example 3 | a/b/d = 5/75/20 | b/c/e = 65/15/20 | a/b/d = 5/75/20 | 21 | applied | 80 |
| Example 4 | a/b = 5/95 | b/c/e = 80/10/10 | a/b = 5/95 | 26.3 | applied | 80 |
| Example 5 | a/b/d = 5/75/20 | b/c/e = 55/15/30 | a/b/d = 5/75/20 | 19.5 | applied | 80 |
| Comparative Example 1 | a/b/d = 5/75/20 | b/c/e = 65/15/20 | a/b/d = 5/75/20 | 21 | not applied | 80 |
| Comparative Example 2 | a/b/d = 5/75/20 | b/c/e = 65/15/20 | a/b/d = 5/75/20 | 21 | applied | 80 |
| Comparative Example 3 | a/b/d = 5/75/20 | b/c/e = 65/15/20 | a/b/d = 5/75/20 | 21 | applied | 80 |
| Comparative Example 4 | a/b/d = 5/75/20 | b/c/e = 65/15/20 | a/b/d = 5/71/24 | 21 | applied | 80 |

| | Undraw Film Thickness Ratio of Layer Constitution | Transverse Stretching Step | | | |
|---|---|---|---|---|---|
| | | Preheating Temperature (° C.) | Drawing Temperature (° C.) | Draw Ratio | Heat-Setting Temperature (° C.) |
| Example 1 | A/B/C = 2/6/2 | 80 | 75 | 5.5 | 76 |
| Example 2 | A/B/C = 2/6/2 | 80 | 75 | 5.5 | 76 |
| Example 3 | A/B/C = 3/4/3 | 80 | 75 | 5.5 | 76 |
| Example 4 | A/B/C = 2/6/2 | 83 | 78 | 6.5 | 79 |
| Example 5 | A/B/C = 2/6/2 | 80 | 75 | 5.5 | 76 |
| Comparative Example 1 | A/B/C = 2/6/2 | 80 | 75 | 5.5 | 76 |
| Comparative Example 2 | A/B/C = 0.5/9/0.5 | 80 | 75 | 5.5 | 76 |
| Comparative Example 3 | A/B/C = 1.5/6/2.5 | 80 | 75 | 5.5 | 76 |
| Comparative Example 4 | A/B/C = 2/6/2 | 80 | 75 | 5.5 | 76 |

TABLE 3

Property of Void-Containing Heat-Shrinkable Film

| | Thickness (μm) | Hot Water Shrinkage Rates 90° C. Longitudinal Direction (%) | Hot Water Shrinkage Rates 90° C. Width Direction (%) | Gloss (%) Layer A | Gloss (%) Layer C | Thickness of the Non-Foamed Layer (μm) Layer A | Thickness of the Non-Foamed Layer (μm) Layer C | Thickness of the Non-Foamed Layer (μm) Difference |
|---|---|---|---|---|---|---|---|---|
| Example 1 | 45 | 5 | 77 | 80 | 83 | 7.3 | 7.4 | 0.1 |
| Example 2 | 44 | 4 | 75 | 81 | 86 | 7.3 | 7.5 | 0.2 |
| Example 3 | 43 | 8 | 79 | 138 | 130 | 11.1 | 10.9 | 0.2 |
| Example 4 | 45 | 3 | 82 | 78 | 75 | 7.5 | 7.3 | 0.2 |
| Example 5 | 49 | 0 | 69 | 55 | 51 | 7.4 | 7.3 | 0.1 |
| Comparative Example 1 | 45 | 5 | 77 | 80 | 74 | 7.5 | 7.3 | 0.2 |
| Comparative Example 2 | 51 | −1 | 63 | 32 | 30 | 1.8 | 1.8 | 0 |
| Comparative Example 3 | 45 | 7 | 76 | 45 | 110 | 5.5 | 9 | 3.5 |
| Comparative Example 4 | 45 | 6 | 75 | 80 | 75 | 7.4 | 7.3 | 0.1 |

Property of Void-Containing Heat-Shrinkable Film

| | Density between the Non-Foamed Layers (g/cm³) Layer A | Density between the Non-Foamed Layers (g/cm³) Layer C | Density between the Non-Foamed Layers (g/cm³) Difference | Amorphous Component of the Non-Foamed Layer (mol %) Layer A | Amorphous Component of the Non-Foamed Layer (mol %) Layer C | Amorphous Component of the Non-Foamed Layer (mol %) Difference | Apparent Specific Gravity (g/cm³) |
|---|---|---|---|---|---|---|---|
| Example 1 | 1.306 | 1.307 | 0.001 | 22.6 | 22.4 | 0.2 | 1.05 |
| Example 2 | 1.306 | 1.307 | 0.001 | 22.5 | 22.3 | 0.2 | 1.07 |
| Example 3 | 1.306 | 1.308 | 0.002 | 22.4 | 22.3 | 0.1 | 1.1 |
| Example 4 | 1.303 | 1.304 | 0.001 | 28.4 | 28.6 | 0.2 | 1.05 |
| Example 5 | 1.306 | 1.307 | 0.001 | 22.5 | 22.7 | 0.2 | 0.95 |
| Comparative Example 1 | 1.305 | 1.311 | 0.006 | 22.5 | 22.3 | 0.2 | 1.05 |
| Comparative Example 2 | 1.306 | 1.307 | 0.001 | 22.6 | 22.6 | 0 | 0.92 |
| Comparative Example 3 | 1.306 | 1.307 | 0.001 | 22.4 | 22.5 | 0.1 | 1.05 |
| Comparative Example 4 | 1.306 | 1.308 | 0.002 | 22.6 | 21.3 | 1.3 | 1.05 |

Property of Void-Containing Heat-Shrinkable Film

| | Whole Light Transmittance (%) | Solvent Adhesive Strength (N/15 mm) | Width Direction Shrinkage Stress (MPa) | Shrinkage Finishing Properties | Strain by Shrinkage | Curling | Close Adhesion Property of the Label |
|---|---|---|---|---|---|---|---|
| Example 1 | 18 | 6.5 | 5.5 | good | good | good | good |
| Example 2 | 19 | 6.5 | 5.6 | good | good | good | good |
| Example 3 | 23 | 6.8 | 7 | good | good | good | good |
| Example 4 | 29 | 9.5 | 8.2 | good | good | good | good |
| Example 5 | 16 | 5.9 | 4 | good | good | good | good |
| Comparative Example 1 | 18 | 6.3 | 5.8 | good | poor | poor | good |
| Comparative Example 2 | 15 | 4.8 | 3.1 | good | good | good | good |
| Comparative Example 3 | 18 | 6 | 5.6 | poor | poor | poor | good |
| Comparative Example 4 | 18 | 6.9 | 5.3 | good | poor | poor | good |

Example 1

Polyesters for layer A obtained by mixing 5% by weight of polyester a, 75% by weight of polyester b, and 20% by weight of polyester c, polyesters for layer B obtained by mixing 65% by mass of polyester b, 15% by mass of polyester c, and 20% by mass of raw material e, and polyesters for layer C obtained by mixing 5% by weight of polyester a, 75% by weight of polyester b, and 20% by weight of polyester c were prepared. The layer A and the layer C each were molten at 265° C., the layer B was molten at 280° C., and the layers were co-extruded from a T die such that the layer thickness ratio was adjusted to layer A/layer B/layer C=20/60/20, and quenched by cooling (chill) rolls to obtain an undrawn multilayer film with a thickness of 200 μm. The temperature of the cooling roll at that time was 25° C., and the cooling roll was in contact with the layer A. Using a multi-duct, cold air was blown at 10° C. and 8 m/S to the central portion of the layer C opposite to the cooling roll, and cold air was blown at 10° C. and 10 m/S to the end portion of the layer C.

The undrawn film was preliminarily heated until the film temperature reached 80° C. and then drawn in the width (transverse) direction with a tenter. In the drawing, the film was drawn 5.5 times at 75° C. Then, heat-setting was performed at 82° C. while maintaining the film width at the end of drawing, thus obtaining a void-containing heat-shrinkable polyester film.

The evaluation results of the obtained film are shown in Table 3. A film with satisfactory shrinkage finishing properties was obtained.

Example 2

A void-containing heat-shrinkable polyester film was obtained in the same manner as in Example 1 except that the raw material e in the layer B was changed to the raw material f. The evaluation results of the obtained film are shown in Table 3. A film with satisfactory shrinkage finishing properties was obtained.

Example 3

A void-containing heat-shrinkable polyester film was obtained in the same manner as in Example 1 except that the amount of discharge from an extruder was changed, and the layers were co-extruded from a T die such that the layer thickness ratio was adjusted to layer A/layer B/layer A=30/40/30, and quenched by cooling (chill) rolls to obtain an undrawn multilayer film with a thickness of 200 μm. The evaluation results of the obtained film are shown in Table 3. Although the gloss and the apparent specific gravity increased, a film with satisfactory shrinkage finishing properties was obtained.

Example 4

A void-containing heat-shrinkable polyester film was obtained in the same manner as in Example 1 except that polyesters for layer A obtained by mixing 5% by weight of polyester a and 95% by weight of polyester b, polyesters for layer B obtained by mixing 80% by mass of polyester b, 10% by mass of polyester c, and 10% by mass of raw material e, and polyesters for layer C obtained by mixing 5% by weight of polyester a and 95% by weight of polyester b were prepared. The evaluation results of the obtained film are shown in Table 3. Although hot water shrinkage in the width direction and shrinkage stress increased, a film with satisfactory finishing properties was obtained.

Example 5

A void-containing heat-shrinkable polyester film was obtained in the same manner as in Example 1 except that polyesters for layer B obtained by mixing 55% by mass of polyester b, 15% by mass of polyester c, and 30% by mass of raw material e were prepared. The evaluation results of the obtained film are shown in Table 3. Although the gloss and the apparent specific gravity decreased, a film with satisfactory finishing properties was obtained.

Comparative Example 1

A void-containing heat-shrinkable polyester film was obtained in the same manner as in Example 1 except that the blowing of cold air to the layer C, opposite to the cooling roll, using the multi-duct was stopped. The evaluation results of the obtained film are shown in Table 3. The density difference between the layer A and the layer B occurred, so that a slightly curled film which was inferior in strain by shrinkage was formed.

Comparative Example 2

A void-containing heat-shrinkable polyester film was obtained in the same manner as in Example 1 except that the amount of discharge from an extruder was changed, and the layers were co-extruded from a T die such that the layer thickness ratio was adjusted to layer A/layer B/layer A=5/90/5, and quenched by cooling (chill) rolls to obtain an undrawn multilayer film with a thickness of 200 μm. The evaluation results of the obtained film are shown in Table 3. Each thickness of the layer A and the layer B was thin, and a film inferior in gloss was formed.

Comparative Example 3

A void-containing heat-shrinkable polyester film was obtained in the same manner as in Example 1 except that the amount of discharge from an extruder was changed, and the layers were co-extruded from a T die such that the layer thickness ratio was adjusted to layer A/layer B/layer A=15/60/25, and quenched by cooling (chill) rolls to obtain an undrawn multilayer film with a thickness of 200 μm. The evaluation results of the obtained film are shown in Table 3. The thicknesses of the layer A and the layer C were different, and curling occurred after shrinkage, so that a film inferior in shrinkage finishing properties was formed.

Comparative Example 4

A void-containing heat-shrinkable polyester film was obtained in the same manner as in Example 1 except that polyesters for layer C obtained by mixing 5% by weight of polyester a, 71% by weight of polyester b, and 24% by weight of polyester c were prepared. The evaluation results of the obtained film are shown in Table 3. Amorphous mol % differs between the layer A and the layer C (layer A: 22.5 mol %, layer C: 21.3 mol %). The number of moles of the amorphous component differed by 1.2 mol % between the layer A and the layer C, and curling slightly occurred after shrinkage, so that a film inferior in shrinkage finishing properties was formed.

INDUSTRIAL APPLICABILITY

The void-containing heat-shrinkable polyester film of the present invention has high quality and high practical applicability, can obtain beautiful shrinkage finishing properties even at high speed production, and is particularly suitable for a shrinkable label.

The invention claimed is:
1. A void-containing heat-shrinkable polyester film comprising a structure having three or more layers including at least one polyester resin layer containing voids and at least two layers sandwiching the void-containing layer,
   wherein the void-containing heat-shrinkable polyester film satisfies the following requirements (1) to (7):
   (1) heat shrinkage in a main shrinkage direction is 30% or more and 85% or less when being treated in hot water at a treatment temperature of 90° C. for a treatment time of 10 seconds;

(2) gloss on both sides of the film measured at an angle of 60 degrees is 40% or more and 150% or less;
(3) a thickness difference between both outermost layers of the film is 2 μm or less;
(4) thicknesses of both outermost layers of the film are 3 μm or more and 12 μm or less;
(5) a density difference between both outermost layers of the film is 0.005 g/cm3 or less;
(6) a difference in the number of moles of an amorphous component between both outermost layers of the film is 1 mol % or less; and
(7) light transmittance is 40% or less.

2. The void-containing heat-shrinkable polyester film according to claim 1, wherein the film has at least one layer containing titanium oxide.

3. The void-containing heat-shrinkable polyester film according to claim 2, wherein a solvent adhesive strength is 2 N/15 mm width or more and 10 N/15 mm width or less.

4. The void-containing heat-shrinkable polyester film according to claim 1, wherein a solvent adhesive strength is 2 N/15 mm width or more and 10 N/15 mm width or less.

5. The void-containing heat-shrinkable polyester film according to claim 1, wherein a solvent adhesive strength is 2 N/15 mm width or more and 10 N/15 mm width or less.

6. The void-containing heat-shrinkable polyester film according to claim 1, wherein a maximum value of heat shrinkage stress in hot air at 90° C. is 9 MPa or less.

7. The void-containing heat-shrinkable polyester film according to claim 6, wherein the film has at least one layer containing titanium oxide.

8. The void-containing heat-shrinkable polyester film according to claim 7, wherein a solvent adhesive strength is 2 N/15 mm width or more and 10 N/15 mm width or less.

9. A heat-shrinkable label including the void-containing heat-shrinkable polyester film according to claim 8.

10. A package comprising the heat-shrinkable label according to claim 9 covering at least a portion of an outer periphery of an object to be packaged.

11. A heat-shrinkable label including the void-containing heat-shrinkable polyester film according to claim 1.

12. A package comprising the heat-shrinkable label according to claim 11 covering at least a portion of an outer periphery of an object to be packaged.

13. A method for producing the void-containing heat-shrinkable polyester film according to claim 1,
comprising positively cooling both outermost layers to reduce the density difference between both outermost layers in a step of forming an undrawn film from a molten resin.

14. A method for producing the void-containing heat-shrinkable polyester film according to claim 1,
comprising, as a step of positively cooling both outermost layers in a step of forming an undrawn film from a molten resin, cooling one layer with a cooling roll and applying cooling air to the layer on the opposite side to cool the layer by using an apparatus adjusted such that a wind speed difference in a longitudinal direction is 1 m/sec or less.

15. A method for producing the void-containing heat-shrinkable polyester film according to claim 8,
comprising positively cooling both outermost layers to reduce the density difference between both outermost layers in a step of forming an undrawn film from a molten resin.

16. A method for producing the void-containing heat-shrinkable polyester film according to claim 8,
comprising, as a step of positively cooling both outermost layers in a step of forming an undrawn film from a molten resin, cooling one layer with a cooling roll and applying cooling air to the layer on the opposite side to cool the layer by using an apparatus adjusted such that a wind speed difference in a longitudinal direction is 1 m/sec or less.

* * * * *